United States Patent
Ji et al.

(10) Patent No.: US 9,840,649 B2
(45) Date of Patent: Dec. 12, 2017

(54) SINGLE CRYSTAL CBN FEATURING MICRO-FRACTURING DURING GRINDING

(71) Applicant: DIAMOND INNOVATIONS, INC., Worthington, OH (US)

(72) Inventors: Shuang Ji, Lewis Center, OH (US); Christopher Long, Westerville, OH (US); Susanne Sowers, Dublin, OH (US); Kai Zhang, Westerville, OH (US)

(73) Assignee: DIAMOND INNOVATIONS INC., Worthington, OH (US)

( * ) Notice: Subject to any disclaimer, the term of this patent is extended or adjusted under 35 U.S.C. 154(b) by 0 days.

(21) Appl. No.: 14/027,606

(22) Filed: Sep. 16, 2013

(65) Prior Publication Data

US 2014/0090307 A1    Apr. 3, 2014

Related U.S. Application Data

(60) Provisional application No. 61/707,943, filed on Sep. 29, 2012.

(51) Int. Cl.

| | |
|---|---|
| *B24D 3/00* | (2006.01) |
| *B24D 3/02* | (2006.01) |
| *B24D 11/00* | (2006.01) |
| *B24D 18/00* | (2006.01) |
| *C09K 3/14* | (2006.01) |
| *B01J 3/06* | (2006.01) |

(52) U.S. Cl.
CPC ............. *C09K 3/1409* (2013.01); *B01J 3/062* (2013.01); *B01J 2203/061* (2013.01); *B01J 2203/062* (2013.01); *B01J 2203/066* (2013.01); *B01J 2203/068* (2013.01); *B01J 2203/0645* (2013.01); *B01J 2203/0655* (2013.01)

(58) Field of Classification Search
USPC .......................................... 51/307, 293, 309
See application file for complete search history.

(56) References Cited

U.S. PATENT DOCUMENTS

| | | | | |
|---|---|---|---|---|
| 2006/0042172 | A1* | 3/2006 | Sung | .................... C09K 3/1409 |
| | | | | 51/309 |
| 2010/0041315 | A1* | 2/2010 | Sung | .................... B24D 3/008 |
| | | | | 451/28 |
| 2010/0064594 | A1* | 3/2010 | Pakalapati | .......... C04B 35/5831 |
| | | | | 51/308 |

FOREIGN PATENT DOCUMENTS

| | | |
|---|---|---|
| JP | 2006117905 A | 5/2006 |
| JP | 2012152830 A | 8/2012 |
| TW | 201012596 A | 4/2010 |
| TW | 201035298 A | 10/2010 |

(Continued)

OTHER PUBLICATIONS

Taniguchi et al (Defect characterization of cBN single crystals grown under HT/HP, Phys. Stat. Sol. (a) 201, No. 11, 2573-2577 (2004)).*

(Continued)

*Primary Examiner* — James McDonough
(74) *Attorney, Agent, or Firm* — Corinne R. Gorski

(57) ABSTRACT

A superabrasive material and method of making the superabrasive material are provided. The superabrasive material may comprise a superabrasive crystal having an irregular surface. The superabrasive material further comprises a plurality of structure defects within the superabrasive crystal. The plurality of structure defects may cause micro-chipping when used as grinding materials.

13 Claims, 2 Drawing Sheets

(56) References Cited

FOREIGN PATENT DOCUMENTS

| WO | 0207871 A2 | 1/2002 |
| WO | 03040062 A2 | 5/2003 |
| WO | 2012130869 A1 | 10/2012 |

OTHER PUBLICATIONS

Taniguchi et al. (Defect characterization of cBN crystals grown under HT/HP, Phys. Stat. Sol. (a) 201, No. 11 2573-2577 (2004)).*
Ichida et al. "Fractal Analysis of Self-Sharpening Phenomenon in cBN Grinding". Key Engineering Materials vol. 389-390. pp. 42-47.
Ichida. "Micro fracture behavior of cutting edges in grinding using single crystal cBN grains". Diamond & Related Materials 17 (2008) [[ 1759-1763.
Sumiya H et al. "Microstructure features of polycrystalline diamond synthesized directly from graphite under static high pressure", Journal of Materials Science, Kluwer Acadamic Publishers, Dordrecht, vol. 39, No. 2, Jan. 15, 2004.

* cited by examiner

SINGLE CRYSTAL CBN FEATURING MICRO-FRACTURING DURING GRINDING

CROSS-REFERENCE TO RELATED APPLICATIONS

This application claims priority of provisional application, No. 61/707,943, filed Sep. 29, 2012, titled "Single Crystal cBN Featuring Micro-fracturing During Grinding".

TECHNICAL FIELD AND INDUSTRIAL APPLICABILITY

The present disclosure relates to hard abrasive particles and its method of manufacturing them, more specifically, to the growth of diamond nuclei or cubic boron nitride crystals.

Grinding wheels made with cubic boron nitride (CBN) superabrasive materials in various bond systems such as vitreous-bond, metal-bond, Resin-bond or electroplating are commonly used for grinding applications. Due to the nature of the CBN having hardness next to diamond, the grinding wheel made with CBN possesses low wheel wear, high grinding ratio and good surface finish. However, work piece may be burned if it is ground at accelerated grinding condition.

Therefore, it can be seen that there is a need for a grinding tool made from superhard composite material to be used in toughness demanding operation, such as accelerate grinding condition.

SUMMARY

In one embodiment, a superabrasive material may comprise a superabrasive crystal having an irregular surface; and a plurality of structure defects within the superabrasive crystal, wherein the plurality of structure defects cause micro-chipping when used as grinding materials.

In another embodiment, a method may comprise steps of providing a plurality of hexagonal boron nitride (hBN) grains; providing a plurality of catalysts and subjecting the plurality of hBN grains, the plurality of catalysts to a high pressure and high temperature for a time period sufficient to form a single crystal structure with layered or laminar structure.

In yet another embodiment, a superabrasive material may comprise a superabrasive single crystal having an irregular surface, wherein the single superabrasive crystal has a layered or laminar microstructure aligned substantially parallel to the irregular surface to enable wear or breaking off of layer or laminar microstructure following a layered or laminar structure pattern.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
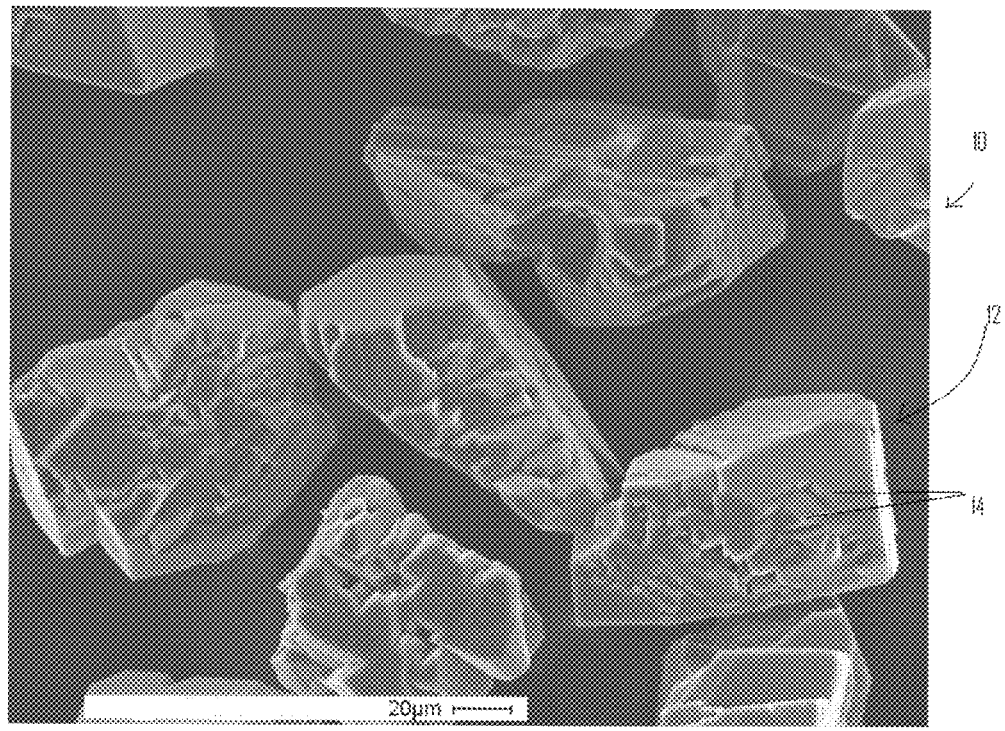
FIG. 1 is a scanning electron micrograph (SEM) image of a superabrasive material according to an exemplary embodiment.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, about 50% means in the range of 45%-55%.

An exemplary embodiment may provide an abrasive grain, such as a cubic boron nitride (cBN) or a diamond (superabrasive) grain, for example, that has a superabrasive single crystal with micro-fracturing during grinding. The superabrasive crystal may be grown under high pressure and high temperature. The superabrasive grain may comprise a superabrasive single crystal having a layered or laminar microstructure. The unique layered or laminar microstructure may possess low grinding power consumption while maintaining a competitive grinding ratio during grinding.

The fracture characteristic of superabrasive crystals, such as cBN subjected to grinding, may be either straight through the superabrasive crystals with cleavage due to naturally formed faceted shape of crystal, or dull to fracture due to high toughness. An exemplary embodiment provides a novel design of a cBN abrasive whose fracture characteristic may be improved through controlling and modifying the crack penetration path so that a low grinding power is expected.

Cubic boron nitride (cBN) grains are known to be produced from hexagonal boron nitride catalyst systems, such as alkali and alkaline earth metal nitrides, under high pressure and temperatures for a time period sufficient to form the cubic structure. The reaction mass is maintained under pressure and temperature conditions that thermodynamically favor the formation of cubic boron nitride crystal. The cubic boron nitride is then recovered from the reaction mass using a combination of water, acidic solutions or caustic chemicals using recovery methods. It should be noted that other methods of producing cubic boron nitride are known, i.e., cubic boron nitride prepared via a temperature gradient method or a shock wave method, and modification of the process taught in the instant application may be used to produce the abrasive grains having unique features.

Any combination of starting ingredients, which provide both the hexagonal boron nitride and catalysts, may be employed. An embodiment of the starting reaction mixture may contain a source of boron, a source of nitrogen, and a source of catalyst metal. The source of the boron may be elemental boron, hexagonal boron nitride, or material such as one of the boron hydrides which may decompose to elemental boron under conditions of the reaction. The source of nitrogen may be either hexagonal boron nitride, or a nitrogen-containing compound of a catalyst metal which may provide a source of nitrogen under reaction conditions. The catalyst metal may be employed as the elemental metal or a catalyst compound which may decompose to the catalyst metal or to the catalyst metal nitride under reaction conditions.

The process is not limited to the catalytic conversion of hexagonal boron nitride to cubic boron nitride involving only one catalyst material. Thus, mixtures of two or more catalyst materials may be employed. Those mixtures may include one or more catalyst metals, one or more catalyst nitrides or one or more combinations of metals and nitrides. The mixtures may include reaction-inhibiting catalysts, such as silicon nitride or aluminum nitride, and reaction-promoting catalysts, such as alkali and alkaline earth metal nitride. In addition, alloys may also be employed in the practice of the invention. These alloys include alloys of more than one catalyst metal as well as alloys of a catalyst metal and a non-catalyst metal. Other raw material combinations are also possible.

The process may be carried out in any type of apparatus capable of producing the pressures and temperatures used to manufacture the superabrasive. An apparatus that may be used is described in U.S. Pat. Nos. 2,941,241 and 2,941,248. Examples of other apparatus include belt presses, cubic presses and split-sphere presses.

The apparatus includes a reaction volume in which controllable temperatures and pressures are provided and maintained for desired periods of time. The apparatus disclosed in the aforementioned patents is a high pressure device for insertion between the platens of a hydraulic press. The high pressure device contains an annular member defining a substantially cylindrical reaction area, and two conical, piston-type members or punches designed to fit into the substantially cylindrical reaction area, and two conical, piston-type members or punches designed to fit into the substantially cylindrical portion of the annular member from either side of the annular member. A reaction vessel which fits into the annular member may be compressed by the two piston members or six piston members to reach the desired pressures in the manufacturing the grains having unique features. The temperature necessary is obtained by a suitable means, such as, by induction heating, direct or indirect resistive heating or other methods.

As shown in FIG. 1, a superabrasive material 10 may comprise a superabrasive crystal 12 which has an irregular surface. The superabrasive crystal may be selected from a group of cubic boron nitride, diamond, and diamond composite materials. In one exemplary embodiment, the superabrasive material 10 may have at least 90%, for example, single superabrasive crystal 12 which has a layered or laminar microstructure 14. In another exemplary embodiment, the superabrasive material 10 may have at least 70%, for example, single superabrasive crystal 12 which has a layered or laminar microstructure 14. In yet another exemplary embodiment, the superabrasive material 10 may have at least 50%, for example, single superabrasive crystal 12 which has a layered or laminar microstructure 14. The layered or laminar microstructure 14 may be aligned substantially parallel to the irregular surface to enable wear or breaking off of microstructure following a layered or laminar structure pattern.

The superabrasive single crystal may have structure defects within the superabrasive surface. These structure defects may include micro cracks or crystal dislocations or flaws. The plurality of structure defects may cause microchipping when used as grinding materials.

The term "superabrasive," as used herein, refers to materials having a Knoop hardness greater than about 4000. The superabrasive crystal 12 may be substantially faceted. The term "facet", as used herein, refers to a flat face on geometric shapes, as shown in FIG. 1, which is defined by edges around a flat face. The superabrasive crystal 12 may be substantially blocky. Blocky, used herein, refers to shape and solidity as a block, appearance being similar in three dimensions.

Superabrasive material, such as cubic boron nitride (cBN), may be used in grinding hard ferrous alloy work pieces due to cBN's relatively non-reactivity with ferrous work pieces. Accordingly, cBN materials often are formed into grinding and machining tools. The toughness of the cBN crystals, as measured by a standard friability test, may be a factor in grinding performance. The friability test involves ball milling a quantity of product under controlled conditions and sieving the residue to measure the breakdown of the product. The toughness index (TI) is measured at room temperature. The thermal toughness index (TTI) is measured after the product has been fired at a high temperature. In many cases the tougher the crystal, the longer the life of the crystal in a grinding or machining tool and, therefore, the longer the life of the tool. This leads to less tool wear and, ultimately, lower overall tool cost.

The range of material removal rates used in profile gear grinding application results in the CBN crystal wear and tear. Thus the CBN grits tend to become progressively dull with wheel usage resulting in an increase in grinding power and the associated risk of thermal damage. It is also highly desirable to have a highly blocky shape to promote uniform wheel wear to achieve consistent gear tooth form from the start to the end of grinding wheel life.

Ellipse ratio may be used to describe the blockiness of the crystals. The ellipse ratio, used herein, may be defined the ratio of the length to the width y/x. CBN grits used in an electroplated wheel may be typically highly blocky in shape with average ellipse ratios lower than 1.50 to promote uniform wheel wear.

Figure 2:
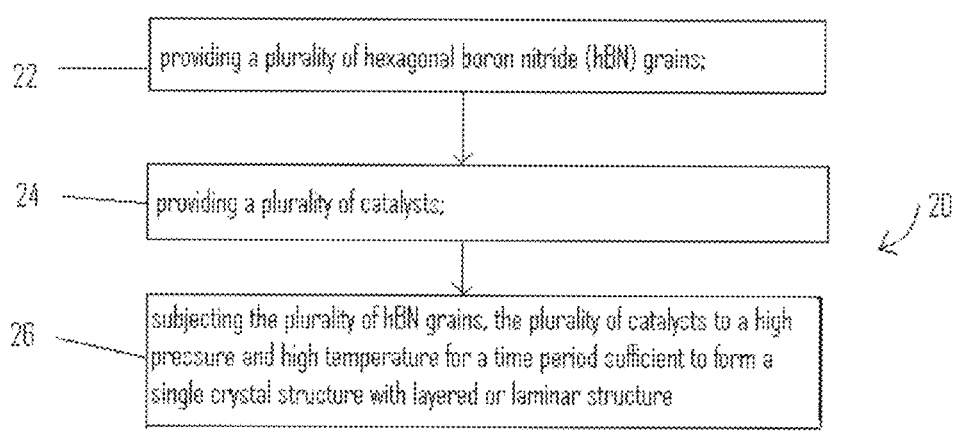
FIG. 2 is a flow diagram illustrating a method of making superabrasive materials according to an exemplary embodiment.

As shown in FIG. 2, a method 20 of making superabrasive materials according to an exemplary embodiment may include steps of providing a plurality of hexagonal boron nitride (hBN) grains in a step 22; providing a plurality of catalysts in a step 24. The catalyst system chosen to grow hBN grains may include lithium compounds as catalysts, for example. An exemplary embodiment may further include subjecting the plurality of hBN grains, the plurality of catalysts to a high pressure and high temperature for a time period sufficient to form a single crystal structure, such as cubic boron nitride, with layered or laminar structure in a step 26. An exemplary embodiment may further include a step of cleaning products by using at least one of water, acidic solutions or caustic chemicals.

In some exemplary embodiment of the method 20, the plurality of catalysts may include a reaction-inhibiting catalyst and reaction promoting catalyst. The reaction-inhibiting catalyst may include nitride compound, such as silicon nitride or aluminum nitride. The reaction promoting catalyst may include alkali and alkaline earth metal nitride compound, such as lithium amide, lithium nitride, or lithium azide, magnesium nitride, calcium nitride, barium nitride. In some embodiments, a molar ratio of reaction-inhibiting catalyst to reaction promoting catalyst may be about zero to about 100.

The output of such a procedure may be cumulative or differential particle size distribution with a median $d_{50}$ size (i.e., half of the particles are smaller than this size and half of the particles are larger than this size) or in general "$d_p$," wherein the "p" percent of the particles is smaller than this "$d_p$" with the remaining part (100–P) percent being larger sized than this "$d_p$".

Superabrasives may be normally identified in size ranges by the referenced standard rather than by sieve number. E.g., particle distributions in 20-30 micron class have 90% of the particles between 20 microns (i.e., "$d_5$") and 30 micrometer (i.e., "$d_{95}$") and less than in 1 in 1000 over 40 microns.

In gear grinding, where thermal damage adversely may affect the life and performance of the gear, it is imperative to use a CBN which exhibits a tendency to fracture in small fractions and thus keeping the wheel sharp and free cutting with a stable grinding power. This property is termed as "micro fracturing" capability.

EXAMPLE 1

Cubic boron nitride (cBN) grains were produced using a mixture that contains catalyst system primarily having alkali and alkaline earth metal nitride, and hydrides, and hexagonal boron nitride. In this example, $Li_3N$, LiOH, LiH, and $Si_3N_4$ catalysts were chosen (see US7001577B2—example 3) to grow CBN grains. A molar ratio of silicon nitride to lithium catalyst was 1:100. The catalysts were employed in order to lower the process temperature. The catalyst was blended with hBN raw materials using a Turbula mixer for 2 hours in a nitrogen rich environment. Sometimes, cBN seeds were included in the blending mixture. The mixture was compacted into a cell by isostatic compaction. The cell was made to fit the reaction capsule of a high pressure high temperature apparatus.

During high temperature high pressure process (about 55 Kbar in pressure at about 1700° C.), hexagonal boron nitride was reacted with catalysts and formed alkaline boron nitride, a eutectic phase from which cubic boron nitrides grains were precipitated and grown under thermal dynamically stable condition.

The reaction capsule was then released from HPHT condition and returned to normal condition. The reaction mass of the mixture in the reaction capsule was removed into a tantalum barrel and thoroughly rinsed with hot water in order to refine cubic boron nitride grains from residual hexagonal boron nitride. The mixture was agitated for about 10 minutes, and then the hexagonal boron nitride suspension was decanted from the barrel. Hexagonal boron nitride powder was in white color and could be easily recognized during the recovery of cubic boron nitride grains.

This process was repeated twice until most of hexagonal boron nitride was removed. The remaining mixture containing mostly cBN was heated under a heating lamp at 250 Watts for about 15 minutes to dry out. The mixture was then moved into a metal can which was filled with metal balls (⅛") at a ratio of mixture/ball=1:5. The metal can was firmly sealed by clipping the cap and setting it in a Tubular mill for ball milling at 40 RPM for about 10 minutes. This process broke some agglomerate as well as separated hBN from cBN to purify the product.

After ball milling, the mixture was separated from balls by using a sieve, and then put into a nickel crucible (1000 ml size). Some sodium hydroxide powders were added to cover the cubic boron nitride grains. The nickel crucible was inserted into the center of a furnace and heated for about an hour at temperature around 400° C. After done, the crucible was taken out and cooled inside of a ventilation hood for one hour. The mixture was then rinsed using hot water and the reaction by-products were dissolved in solution and out of the crucible. Cubic boron nitride grains were then transferred to a TEFLON beaker. The grains were rinsed with a nitric acid solution in the baker for about 10 minutes. The acid solution was then washed out for about 5 minutes using DI water. Finally, the grains were rinsed with Isopropyl alcohol and heat dried for 10 minutes. After the grains were cooled down to room temperature, the grains were classified by sizes using mesh sieves. They were sorted into twelve mesh sizes: +60; 60/80; 80/100; 100/120; 120/140; 140/170; 170/200; 200/230; 230/270; 270/325; 325/400; and 400–.

EXAMPLE 2

The experimental cBN was made using the example 1 method except the silicon nitride was not used. The product was sorted through sieving. It was classified as 60+, 60/80, 80/100, 100/120, 120/140, 140/170, 170/200, 200/230, 230/270, 270/325, 325/400 and 400–. Toughness Index (TI) and Thermal Toughness Index (TTI) tests were applied to particle sizes of 170/200.

As shown in Table 1 below, Toughness Index (TI), Thermo Toughness Index (TTI), Yield and aspect ratio with process conditions such as Pressure and Power were shown. As the data suggested, ellipse ratio was gradually decreased as pressure was increased. Therefore, high pressure may be used if blocky crystals were preferred in the specified applications.

TABLE 1

| Run # | Pressure | Power | TI- 170/200 | TTI- 170/200 | Yield (gram) | Ellipse ratio 170/200 |
|---|---|---|---|---|---|---|
| I | 3150 | 10730 | 71 | 66.5 | 55 | 1.42 |
| II | 3250 | 10730 | 63 | 56.4 | 76 | 1.4 |
| III | 3350 | 10730 | 61 | 57.1 | 78 | 1.42 |
| IV | 3450 | 10730 | 60 | 57.7 | 95 | 1.43 |
| V | 3550 | 10730 | 60 | 50.8 | 114 | 1.32 |
| VI | 3550 | 10430 | 59 |  | 101 | 1.4 |
| VII | 3655 | 10715 | 58 | 50.4 | 120 | 1.28 |

EXAMPLE 3

The experimental cBN was made using the example 2 and was subjected to a crush test. The degree of micro fracturing from cBN crystals was simulated through a crush device. A mono-layer of cBN crystal was spread onto a carbide disc, and was crushed between a pair of carbide discs. The crush device was connected to a pressure gauge, which was used to monitor the pressure change during crush and to ensure consistency. The debris resulted from the crush mechanism was collected and measured at Microtrac S3500. A particle size distribution (PSD) was obtained.

Figure 3:
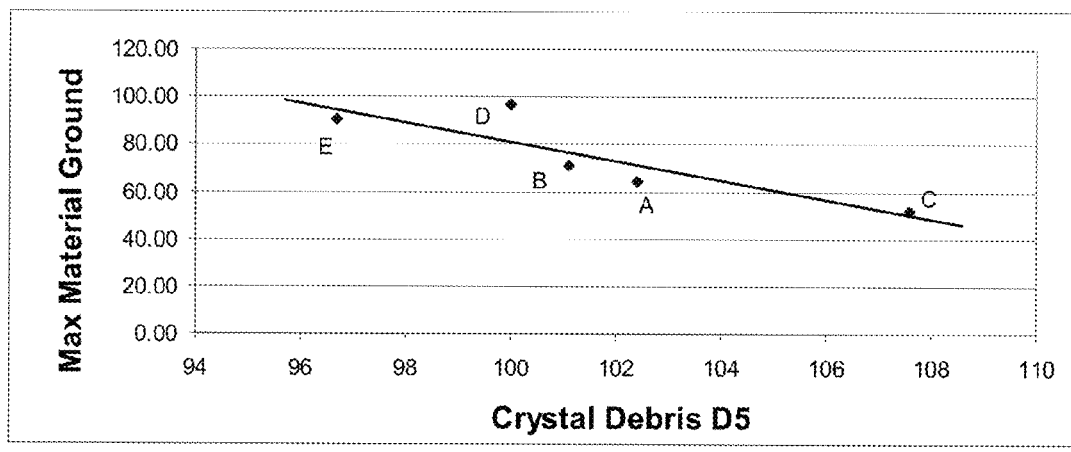
FIG. 3 is a diagram illustrating a grinding performance on Blohm Precimat 306 CNC surface grinder and the degree of micro fracturing according to an exemplary embodiment.

In the PSD, crystals were fully crushed or partially crushed and debris was resulted from the crush. The fully crushed or partially crushed crystals coexisted. However, the lowest size portion of the distribution was mostly interesting since it represented the size of debris solely resulted from the crush process. To be more specific, $D_5$ or $D_{10}$ from PSD was evaluated as a degree of micro fracturing. The $D_{50}$ of the un-crushed crystal was also measured on Microtrac S3500. It was found that the ratio of $D_5$ from the PSD of crushed crystals to the $D_{50}$ of the un-crushed crystal was also indicative of the degree of micro fracturing. Crystals with $D_5/D_{50}$ lower than 0.65 had better performance in micro fracturing and in turn better grinding performance. The relationship between the grinding performance on Blohm Precimat 306 CNC Surface Grinder and the degree of micro fracturing was shown in FIG. 3. Abrasive E represented a competitor's grade, with A, B, C, D representing products produced by examples 1-3. Product D had the lowest $D_5$ around 100 microns. In terms of max material ground, product D had a superior material removal rate than products A, B, and C with a higher removal rate than the competitor's product E. It was demonstrated that with lower $D_5$, or the better micro fracturing, the grinding performance would be improved accordingly.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A superabrasive material comprising:
a plurality of superabrasive crystals, at least 90% of the plurality of crystals having an irregular shape and surface and a layered or laminar structure;
a plurality of structure defects within each the plurality of superabrasive crystals, wherein the plurality of structure defects cause micro-chipping when used as grinding materials;
a d5 post-crushing particle size distribution less than 65% of d50 pre-crushing particle size; and
an ellipse ratio of about 1.25 to about 1.35.

2. The superabrasive material of claim 1, wherein the plurality of superabrasive crystals are selected from a group of cubic boron nitride, diamond, and diamond composite materials.

3. The superabrasive material of claim 1, wherein the plurality of structure defects include micro cracks, crystal dislocations, or flaws.

4. The superabrasive material of claim 1, wherein the plurality of structure defects cause micro-chipping, micro-fracture when the superabrasive materials are used for grinding materials.

5. The superabrasive material of claim 1, wherein the superabrasive material has toughness index from about 53 to about 62.

6. The superabrasive material of claim 1, wherein the layered or laminar microstructure aligned substantially parallel to the irregular surface to enable wear or breaking off of layer or laminar microstructure following a layer or laminar structure pattern.

7. A superabrasive material, comprising:
a plurality of superabrasive crystals, at least 90% of the plurality of crystals having an irregular shape and outer surface, wherein each of the superabrasive crystals has a layered or laminar microstructure aligned substantially parallel to the irregular surface to enable wear or breaking off of layer or laminar microstructure following a layered or laminar structure pattern and an ellipse ratio about 1.25 to about 1.35.

8. The superabrasive material of claim 7, wherein the superabrasive crystals are selected from a group of cubic boron nitride, diamond, and diamond composite materials.

9. The superabrasive material of claim 7, wherein at least 70% of the superabrasive crystals have structure defects.

10. The superabrasive material of claim 9, wherein the structure defects include micro cracks or crystal dislocations, or flaws.

11. The superabrasive material of claim 7, wherein the superabrasive material has toughness index from about 53 to about 62.

12. The superabrasive material of claim 7, wherein the superabrasive material d5 has post-crushing particle size distribution less than 65% of d50 pre-crushing particle size.

13. The superabrasive material of claim 7, wherein at least 90% of the superabrasive crystals have structure defects.

* * * * *